United States Patent
Mori et al.

(10) Patent No.: US 9,960,429 B2
(45) Date of Patent: May 1, 2018

(54) IRON COMPOUND PARTICLES, METHOD FOR PRODUCING THE IRON COMPOUND PARTICLES, AND OXIDATION CATALYST USING THE IRON COMPOUND PARTICLES

(71) Applicant: KABUSHIKI KAISHA TOYOTA CHUO KENKYUSHO, Nagakute-shi, Aichi (JP)

(72) Inventors: Tomiko Mori, Nagakute (JP); Akihiko Suda, Nagakute (JP); Takeshi Morikawa, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days. days.

(21) Appl. No.: 15/391,635

(22) Filed: Dec. 27, 2016

(65) Prior Publication Data

US 2017/0187045 A1 Jun. 29, 2017

(30) Foreign Application Priority Data

Dec. 25, 2015 (JP) ................. 2015-254906
Sep. 9, 2016 (JP) ................. 2016-176591

(51) Int. Cl.
*B01J 23/745* (2006.01)
*B01J 23/80* (2006.01)
(Continued)

(52) U.S. Cl.
CPC ................. *H01M 4/9016* (2013.01)

(58) Field of Classification Search
CPC ........ B01J 23/745; B01J 23/80; B01J 23/862; B01J 23/8892; B01J 35/006; B01J 35/023; B01J 37/02
See application file for complete search history.

(56) References Cited

U.S. PATENT DOCUMENTS 4,400,337 A * 8/1983 Hayashi ............ H01F 1/065
264/129
4,459,276 A * 7/1984 Nobuoka ........... B82Y 30/00
106/456
(Continued)

FOREIGN PATENT DOCUMENTS

JP 3374713 B2 2/2003
JP 2015-086420 A 5/2015
WO 2016-002305 A1 1/2016

OTHER PUBLICATIONS

Garcia, K.E. et al. "Characterization of akaganeite synthesized in presence of Al3+, Cr3+, and Cu2+ ions and urea". Materials Chemistry and Physics, vol. 112., No. 1, pp. 120-126, Nov. 15, 2008.
(Continued)

*Primary Examiner* — Cam N. Nguyen
(74) *Attorney, Agent, or Firm* — Oliff PLC

(57) ABSTRACT

Iron compound particles comprise a β-FeOOH crystal phase and a metal element other than Fe with which the β-FeOOH crystal phase is doped, wherein
the metal element other than Fe is at least one metal element selected from the group consisting of elements of Al as well as 3d and 4d transition metals belonging to periodic table Groups 4 to 12 other than Fe,
an atomic ratio of the metal element other than Fe to the Fe element (metal element other than Fe/Fe element) is 0.001 to 0.5, and
the iron compound particles satisfy at least one of the following requirements (A) and (B):
(A) having a crystallite diameter of 1 to 60 nm when measured by X-ray diffraction; and
(Continued)

(B) having an average particle diameter of 1 to 600 nm when measured by dynamic light scattering in a solvent.

9 Claims, 7 Drawing Sheets

(51) Int. Cl.

| | | |
|---|---|---|
| *B01J 23/86* | (2006.01) | |
| *B01J 23/889* | (2006.01) | |
| *B01J 35/00* | (2006.01) | |
| *B01J 35/02* | (2006.01) | |
| *B01J 37/02* | (2006.01) | |
| *H01M 4/90* | (2006.01) | |

(56) References Cited

U.S. PATENT DOCUMENTS

| | | | | |
|---|---|---|---|---|
| 4,933,004 | A * | 6/1990 | Hoppe | B22F 9/22 |
| | | | | 148/105 |
| 6,140,001 | A * | 10/2000 | Miyaji | B82Y 30/00 |
| | | | | 252/62.52 |
| 6,228,160 | B1 * | 5/2001 | Hanich | C03C 1/04 |
| | | | | 106/456 |
| 9,761,969 | B2 * | 9/2017 | Kishibata | H01R 12/58 |
| 2011/0091772 | A1 * | 4/2011 | Mishima | C01B 25/45 |
| | | | | 429/221 |
| 2016/0237578 | A1 | 8/2016 | Ichikawa et al. | |

OTHER PUBLICATIONS

Mikhailov V. I. et al. "Materials Based on Aluminum and Iron Oxides Obtained by the Hydrothermal Method". Glass Physics and Chemistry, Pleiades Publishing, vol. 40., No. 6, pp. 650-656, Dec. 2, 2014.

Tatsuo Ishikawa et al. "Influences of metal ions on the formation of b-FeOOH particles." Corrosion Science, pp. 1727-1738, May 31, 2001.

Wei-Wei Wang et al. "Effect of metal ions (Sn and Zn) on the thermal property of akaganeite nanorods." Materials Research Bulletin, vol. 47., No. 7, pp. 1762-1767, Mar. 16, 2012.

May 30, 3017 Extended Search Report issued in European Patent Application No. 16206788.8.

Seitz, Linsey C. et al. "A highly active and stable IrOx/SrIrO3 catalyst for the oxygen evolution reaction". Science vol. 353, issue 6303, pp. 1011-1014; 2016.

Xunyu Lu et al., "Electrodeposition of hierarchically structured three-dimensional nickel-iron electrodes for efficient oxygen evolution at high current densities". Nature Communications vol. 6, Article No. 6616; 2015.

Chemelewsiki, William D. et al., "Electrodeposition of Ni-doped FeOOH oxygen evolution reaction catalyst for photoelectrochemical water splitting". J. Master Chem. A, vol. 2., pp. 14957-14962, 2014.

Tufo, Ana E., "Structural and hyperfine properties of Mn and Co-incorporated akaganeites". Hyperfine Interact vol. 224., pp. 239-250, 2014.

\* cited by examiner

IRON COMPOUND PARTICLES, METHOD FOR PRODUCING THE IRON COMPOUND PARTICLES, AND OXIDATION CATALYST USING THE IRON COMPOUND PARTICLES

BACKGROUND OF THE INVENTION

Field of the Invention

The present invention relates to iron compound particles having a β-FeOOH crystal phase, a method for producing the iron compound particles, and an oxidation catalyst using the iron compound particles.

Related Background Art

As one solution to problems concerning global environment and fossil fuel depletion, attention has been focused on the utilization of hydrogen energy and carbon dioxide fixation technique. Above all, a water splitting reaction by which water is decomposed into hydrogen and oxygen at normal temperature and normal pressure and a reduction reaction of carbon dioxide using water as an electron source are expected as clean energy generation methods. These reactions inevitably require that water should undergo an oxidation reaction:

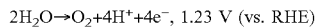

$2H_2O \rightarrow O_2 + 4H^+ + 4e^-$, 1.23 V (vs. RHE)

However, since the reaction efficiency is low, there have been demands for a catalyst which promotes the water oxidation reaction. As such water oxidation catalysts, oxides including cobalt oxide, ruthenium oxide, iridium oxide, and the like have been known conventionally.

In addition, recently, water oxidation catalysts utilizing an iron compound such as $Fe_2O_3$ or FeOOH have been reported, too. However, if an iron compound such as $Fe_2O_3$ or FeOOH is amorphous, this brings about a problem that the oxidation catalyst has a low activity in comparison with other oxide catalysts.

Hence, W. D. Chemelewski et al., J. Mater. Chem A, 2014, Iss. 2, pp. 14957 to 14962 (Non Patent Document 1) have proposed, as an oxidation catalyst, amorphous FeOOH doped with a Ni element. Although the Ni doping improves the catalytic activity, this oxidation catalyst does not always have a sufficiently high catalytic activity.

Further, A. E. Tufo et al., Hyperfine Interact, 2014, Vol. 224, pp. 239 to 250 (Non Patent Document 2) have proposed β-FeOOH doped with a Mn element or a Co element.

SUMMARY OF THE INVENTION

However, as a result of examining β-FeOOH doped with a Co element proposed in Non Patent Document 2, the present inventors have found that the activity as an oxidation catalyst is low.

The present invention has been made in view of the above-described problems of the conventional techniques. An object of the present invention is to provide iron compound particles having an excellent oxidative catalytic activity and a method for producing the iron compound particles.

Since FeOOH doped with a Ni element described in Non Patent Document 1 is amorphous, the FeOOH does not sufficiently function as an oxidation catalyst. Moreover, the catalyst is prepared under a pH condition of 7 or more, so that Fe hydroxide and Ni hydroxide are each independently deposited, decreasing the homogeneity as a catalyst. For these reasons, the present inventors speculate that a sufficiently high oxidative catalytic activity is not obtained. Meanwhile, β-FeOOH doped with a Mn element or a Co element described in Non Patent Document 2 is large in particle diameter. For this reason, the inventors speculate that a sufficiently high oxidative catalytic activity is not obtained.

Hence, the present inventors have conducted intensive study to achieve the above object. As a result, the inventors have found that when a raw-material solution containing a Fe ion and a metal ion other than the Fe ion is mixed with a solution containing a neutralizer in such a manner that the pH is 1.8 to 5.0, this makes it possible to obtain iron compound particles having a β-FeOOH crystal phase doped with the metal element other than Fe, and also that at least one of the average particle diameter and the crystallite diameter is made small. Further, the inventors have found that the iron compound particles have an excellent oxidative catalytic activity. These findings have led to the completion of the present invention.

Specifically, iron compound particles of the present invention comprise a β-FeOOH crystal phase and a metal element other than Fe with which the β-FeOOH crystal phase is doped, wherein the metal element other than Fe is at least one metal element selected from the group consisting of elements of Al as well as 3d and 4d transition metals belonging to periodic table Groups 4 to 12 other than Fe, an atomic ratio of the metal element other than Fe to the Fe element (metal element other than Fe/Fe element) is 0.001 to 0.5, and the iron compound particles satisfy at least one (preferably both) of the following requirements (A) and (B):

(A) having a crystallite diameter of 1 to 60 nm when measured by X-ray diffraction; and (B) having an average particle diameter of 1 to 600 nm when measured by dynamic light scattering in a solvent.

In the iron compound particles of the present invention, a content of the β-FeOOH crystal phase is preferably 50 to 100 mol % relative to that of all iron compound crystal phases. Moreover, preferably, primary particles thereof are rod shaped, major axes of the primary particles have an average length of 1 to 50 nm, and an average ratio of the major axes to minor axes in terms of length (major axes/minor axes) is 3 to 10. Furthermore, the metal element other than Fe is preferably at least one metal element selected from the group consisting of a Ni element, a Co element, a Mn element, a Cr element, a Zn element and an Al element.

In addition, an oxidation catalyst of the present invention comprises such iron compound particles of the present invention.

A method for producing iron compound particles of the present invention comprises preparing a colloidal solution having a pH of 1.8 to 5.0 by mixing a raw-material solution A containing a Fe ion and at least one metal ion other than the Fe ion selected from the group consisting of an Al ion as well as 3d and 4d transition metal ions belonging to periodic table Groups 4 to 12 other than the Fe ion with a raw-material solution B containing a neutralizer, so that iron compound particles having a β-FeOOH crystal phase doped with a metal element other than Fe are obtained.

In the method for producing iron compound particles of the present invention, preferably, the metal ion other than the Fe ion is at least one metal ion selected from the group consisting of a Ni ion, a Co ion, a Mn ion, a Cr ion, a Zn ion and an Al ion, and the neutralizer is a basic compound.

Note that although it is not exactly clear why the iron compound particles of the present invention are excellent in the oxidative catalytic activity, the present inventors speculate as follows. Specifically, in the iron compound particles of the present invention, the β-FeOOH crystal phase is doped with the metal element other than Fe, thereby changing the electron state at Fe sites. For example, in a water oxidation reaction, this makes it possible to easily extract an electron from the hydroxyl group, or facilitates adsorption of the reaction intermediate. The inventors speculate that, for these reasons, the iron compound particles of the present invention readily promote the oxidation reaction in comparison with a β-FeOOH crystal phase not doped with any metal element.

The present invention makes it possible to obtain iron compound particles having an excellent oxidative catalytic activity.

DETAILED DESCRIPTION OF THE PREFERRED EMBODIMENTS

Figure 1:
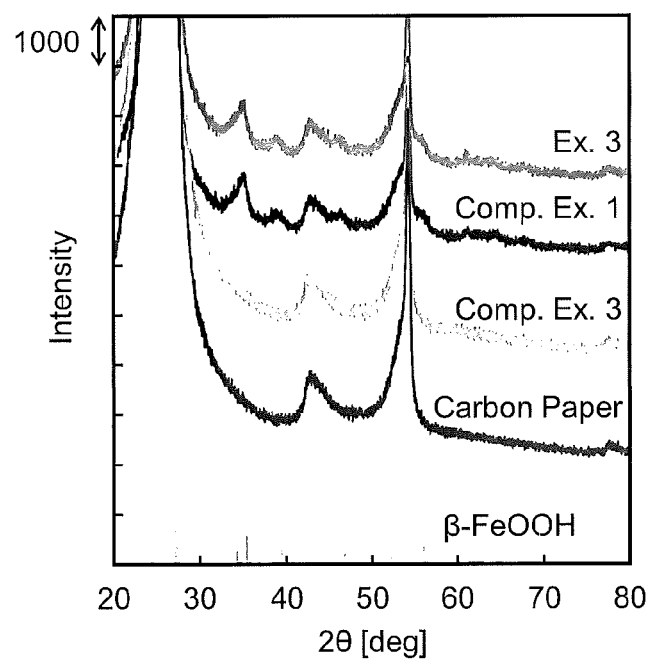
FIG. 1 is a graph showing X-ray diffraction patterns measured on samples which were each supported on carbon paper using solutions obtained in Example 3, Comparative Example 1, and Comparative Example 3.

Hereinafter, the present invention will be described in detail based on preferred embodiments thereof.

First, iron compound particles of the present invention will be described. The iron compound particles of the present invention comprise a β-FeOOH crystal phase. Moreover, the iron compound particles of the present invention may comprise other iron compounds than the β-FeOOH crystal phase. Examples of such other iron compounds include other iron oxyhydroxide crystal phases such as α-FeOOH, γ-FeOOH, δ-FeOOH, and ferrihydrite, iron oxides such as FeO, $Fe_2O_3$, and $Fe_3O_4$, hydroxides, components contained in iron rust, and amorphous components thereof.

In the iron compound particles of the present invention, a content of the β-FeOOH crystal phase is preferably 50 to 100 mol %, more preferably 70 to 100 mol %, and particularly preferably 80 to 100 mol %, relative to that of all iron compound crystal phases. If the content of the β-FeOOH crystal phase is less than the lower limit, the oxidative catalytic activity tends to be low. Note that, in the present invention, the content of the β-FeOOH crystal phase refers to a value obtained from an intensity ratio of a peak having the highest intensity or a peak having the second highest intensity derived from each iron compound, which are observed at 2θ=30 to 40° in an X-ray diffraction pattern of the iron compound particles.

Further, the iron compound particles of the present invention comprise a metal element other than Fe with which the β-FeOOH crystal phase is doped. Thereby, the oxidative catalytic activity is improved in comparison with a β-FeOOH crystal phase not doped with any metal element. Additionally, a portion of the metal element other than Fe may be supported around the β-FeOOH crystal phase without being used for the doping thereof. The metal element other than Fe according to the present invention is at least one metal element selected from the group consisting of elements of Al as well as 3d and 4d transition metals belonging to periodic table Groups 4 to 12 other than Fe. Since these metal elements have atomic radii similar to that of the Fe element, it is conceivable that the metal element readily substitutes for the Fe element or readily incorporates into the β-FeOOH crystal lattice or crystal grain boundary. In addition, from the viewpoint of obtaining a higher oxidative catalytic activity, among these metal elements, preferable are a Ni element, a Co element, a Mn element, a Cr element, a Zn element, and an Al element; more preferable are a Ni element, a Co element, and an Al element; and particularly preferable is a Ni element.

In the iron compound particles of the present invention, an atomic ratio of such a metal element other than Fe to the Fe element (metal element other than Fe/Fe element) is 0.001 to 0.5. If the ratio of metal element other than Fe/Fe element is less than the lower limit, the oxidative catalytic activity becomes low. On the other hand, if the ratio of metal element other than Fe/Fe element exceeds the upper limit, the growth of the β-FeOOH crystal phase is inhibited; moreover, uniform doping with the metal element other than Fe becomes difficult, so that the oxidative catalytic activity is not improved. From the viewpoints of enabling uniform doping with the metal element other than Fe and obtaining a high oxidative catalytic activity, the ratio of metal element other than Fe/Fe element is preferably 0.002 to 0.45, and more preferably 0.005 to 0.4. Note that, in the present invention, the "ratio of metal element other than Fe/Fe element" can be determined by inductively coupled plasma (ICP) emission spectrometry, energy-dispersive X-ray spectrometry (SEM-EDX), X-ray photoelectron spectrometry (XPS), or the like.

Further, the iron compound particles of the present invention satisfy at least one of the following requirements (A) and (B):

(A) having a crystallite diameter of 1 to 60 nm when measured by X-ray diffraction; and (B) having an average particle diameter of 1 to 600 nm when measured by dynamic light scattering in a solvent (preferably in water).

The iron compound particles satisfying at least one of the requirements (A) and (B) have an excellent oxidative catalytic activity. Moreover, from the viewpoint of obtaining a higher oxidative catalytic activity, it is preferable to satisfy both of the above requirements (A) and (B). Note that, in the present invention, although it is preferable to measure both of the crystallite diameter and the average particle diameter, only the crystallite diameter may be measured if it is difficult to prepare a dispersion (colloidal solution) of the iron compound particles; alternatively, if it is difficult to recover the iron compound in a solution as a solid or to fix the iron compound, only the average particle diameter may be measured.

In the present invention, if the crystallite diameter of the iron compound particles is out of the above-described range, the oxidative catalytic activity becomes low. Moreover, from the viewpoint of obtaining a higher oxidative catalytic activity, the iron compound particles have a crystallite diameter of preferably 1 to 30 nm, and more preferably 1 to 15 nm.

Further, in the present invention, if the average particle diameter of iron compound particles is out of the above-described range, the oxidative catalytic activity becomes low. Moreover, from the viewpoint of obtaining a higher oxidative catalytic activity, the iron compound particles have an average particle diameter of preferably 1 to 300 nm, and more preferably 1 to 150 nm.

Such iron compound particles of the present invention function as an electrochemical oxidation catalyst at a low overpotential and are superior in stability of the oxidative catalytic activity, in comparison with iron compound particles not doped with any metal element and iron compound particles in which an iron compound crystal phase other than the β-FeOOH crystal phase is doped with a metal element.

Furthermore, in the iron compound particles of the present invention, primary particles thereof are preferably rod shaped. In such rod-shaped iron compound primary particles, major axes thereof have an average length of preferably 1 to 50 nm, and more preferably 5 to 25 nm. If the average length of the major axes of the primary particles is less than the lower limit, the crystallinity tends to be low, so that a high catalytic activity is not obtained. On the other hand, if the average length exceeds the upper limit, the specific surface area tends to be small, so that the oxidative catalytic activity becomes low, or a stable aqueous colloidal solution is not obtained, making support coating and drying difficult and making it impossible to easily impart the function.

Moreover, in the rod-shaped iron compound primary particles, an average ratio of the major axes to minor axes in terms of length (major axes/minor axes) (average axis ratio) is preferably 3 to 10, and more preferably 3 to 7. If the average axis ratio of the primary particles is less than the lower limit, the crystallinity tends to be low, so that a high catalytic activity is not obtained. On the other hand, if the average axis ratio exceeds the upper limit, the specific surface area tends to be small, so that the oxidative catalytic activity becomes low, or a stable aqueous colloidal solution is not obtained, making support coating and drying difficult and making it impossible to easily impart the function.

Note that such lengths of the major axes and minor axes of the iron compound primary particles can be measured, for example, in a TEM image or a STEM image. Moreover, in the present invention, "the average length of the major axes of the primary particles" refers to a value obtained by averaging the lengths of major axes of 50 or more iron compound primary particles randomly sampled in a TEM image or a STEM image, while "the average ratio of the major axes to minor axes in terms of length (major axes/minor axes) (average axis ratio)" refers to a value obtained by averaging ratios of the major axes to minor axes in terms of length (major axes/minor axes) of 50 or more iron compound primary particles randomly sampled.

Next, a method for producing iron compound particles of the present invention will be described. The method for producing iron compound particles of the present invention comprises preparing a colloidal solution having a pH of 1.8 to 5.0 by mixing a raw-material solution A containing a Fe ion and a metal ion other than the Fe ion with a raw-material solution B containing a neutralizer, so that iron compound particles having a β-FeOOH crystal phase doped with a metal element other than Fe are obtained.

The Fe ion used in the method for producing iron compound particles of the present invention may be divalent Fe ion ($Fe^{2+}$) or trivalent Fe ion ($Fe^{3+}$). Nevertheless, $Fe^{3+}$ is preferable from the viewpoint that rod-shaped β-iron compound particles are formed.

Moreover, the metal ion other than the Fe ion used in the method for producing iron compound particles of the present invention is at least one metal ion selected from the group consisting of an Al ion as well as 3d and 4d transition metal ions belonging to periodic table Groups 4 to 12 other than the Fe ion. Since these metal ions other than the Fe ion have atomic radii similar to those of the Fe ion, it is conceivable that the metal element readily substitutes for the Fe element or readily incorporates into the β-FeOOH crystal lattice or crystal grain boundary. In addition, from the viewpoint of obtaining a higher oxidative catalytic activity, among these metal ions other than the Fe ion, preferable are a Ni ion, a Co ion, a Mn ion, a Cr ion, a Zn ion, and an Al ion; more preferable are a Ni ion, a Co ion, and an Al ion; and particularly preferable is a Ni ion.

In the method for producing iron compound particles of the present invention, a molar ratio of the metal ion other than the Fe ion to the Fe ion (metal ion other than Fe ion/Fe ion) is preferably 0.2/100 to 80/100, more preferably 0.5/100 to 80/100, and particularly preferably 1/100 to 75/100. If "the ratio of metal ion other than Fe ion/Fe ion" is less than the lower limit, the oxidative catalytic activity tends to be low. On the other hand, if "the ratio of metal ion other than Fe ion/Fe ion" exceeds the upper limit, there is a trend that the oxidative catalytic activity is not further improved.

The concentration of the Fe ion in the raw-material solution A is not particularly limited, but is preferably 0.01 to 1 mol/L. Moreover, the concentration of the metal ion other than the Fe ion in the raw-material solution A is not particularly limited, but is preferably 0.0001 to 0.8 mol/L.

The source of the Fe ion and the source of the metal ion other than the Fe ion used in the method for producing iron compound particles of the present invention are not particularly limited, as long as they dissolve in a solvent. Examples of the sources include inorganic salts such as chlorides, nitrates, and sulfates; and organic salts such as citrates. Moreover, the solvent is not particularly limited, as long as it is capable of dissolving the ion sources. Examples of the solvent include water, water-soluble organic solvents (such as methanol, ethanol, propanol, isopropanol, butanol, acetone, acetonitrile, and dimethylformamide), and mixture solvents of water with water-soluble organic solvents.

The neutralizer used in the method for producing iron compound particles of the present invention is not particularly limited, as long as it is a basic compound having a neutralization action. Examples of the neutralizer include inorganic basic compounds such as sodium hydroxide, potassium hydroxide, and ammonia; and organic basic compounds such as ethylenediamine, hydrazine, monoethanolamine, diethanolamine, and triethanolamine. The concentration of the neutralizer in the raw-material solution B is not particularly limited, but is preferably 0.01 to 1 mol/L.

Further, the method for producing iron compound particles of the present invention may use, as necessary, a dispersant such as aminocaproic acid and ε-caprolactam. Such a dispersant may be added to any one of the raw-material solutions A and B, but is preferably added to the raw-material solution B.

In the method for producing iron compound particles of the present invention, the raw-material solution A and the raw-material solution B as described above are mixed together to thereby prepare a colloidal solution. In this event, the raw-material solution A is mixed with the raw-material solution B such that the colloidal solution has a pH of 1.8 to 5.0. If the colloidal solution has a pH less than the lower limit, the $Fe^{3+}$ hydroxide formation does not progress, so that no β-FeOOH crystal phase is formed, and the oxidative catalytic activity becomes low. On the other hand, if the colloidal solution has a pH exceeding the upper limit, the average particle diameter of the iron compound particles becomes remarkably large, and the oxidative catalytic activity becomes low. Moreover, from the viewpoint of surely obtaining iron compound particles having a β-FeOOH crystal phase and a small average particle diameter, the colloidal solution has a pH of preferably 1.9 to 4.0, and more preferably 2.0 to 3.0.

In the method for producing iron compound particles of the present invention, when the raw-material solution A is mixed with the raw-material solution B, the temperature is not particularly limited. The mixing is preferably performed at 50° C. or less (more preferably 10 to 30° C.). If the mixing temperature exceeds the upper limit, the crystallite diameter and the average particle diameter of the iron compound particles as well as the lengths of the major axes and minor axes of the rod-shaped primary particles tend to be increased, so that the oxidative catalytic activity becomes low. Moreover, the method for mixing the raw-material solution A with the raw-material solution B is not particularly limited, as long as the method allows sufficient stirring.

The iron compound particles obtained as described above have a β-FeOOH crystal phase doped with a metal element other than Fe, and also have a small crystallite diameter and/or a small average particle diameter. Such iron compound particles have an excellent oxidative catalytic activity. Note that a portion of the metal element other than Fe may be supported around the β-FeOOH crystal phase without being used for the doping thereof.

EXAMPLES

Hereinafter, the present invention will be more specifically described on the basis of Examples and Comparative Examples. However, the present invention is not limited to the following Examples.

Example 1

In a beaker, $FeCl_3 \cdot 6H_2O$ (27.30 g, 101 mmol) and $Zn(NO_3)_2 \cdot 6H_2O$ (1.25 g, 4.20 mmol) were dissolved in ion-exchanged water (500 ml). Thereby, a raw-material aqueous solution containing a metal ion was prepared which had a Fe-ion concentration of 0.2 mol/L (raw-material solution A). Moreover, in a beaker, an ethylenediamine solution (11 ml) having been diluted to ½ with ion-exchanged water was dissolved in ion-exchanged water (500 ml). Thereby, a raw-material aqueous solution containing a neutralizer was prepared (raw-material solution B). The raw-material solutions A and B were mixed and stirred together in a beaker at room temperature (25° C.) with a magnetic stirrer using a stir bar (rotation speed: 400 rpm) for 30 minutes. Thus, a colloidal solution of an iron compound was prepared. By using a pH meter, the pH of the obtained colloidal solution was measured and found to be 2.2.

Example 2

A colloidal solution of an iron compound was prepared in the same manner as in Example 1, except that $Co(NO_3)_2 \cdot 6H_2O$ (1.22 g, 4.19 mmol) was used in place of $Zn(NO_3)_2 \cdot 6H_2O$. The obtained colloidal solution had a pH of 2.2.

Example 3

A colloidal solution of an iron compound was prepared in the same manner as in Example 1, except that $Ni(NO_3)_2 \cdot 6H_2O$ (1.21 g, 4.16 mmol) was used in place of $Zn(NO_3)_2 \cdot 6H_2O$. The obtained colloidal solution had a pH of 2.2.

Example 4

A colloidal solution of an iron compound was prepared in the same manner as in Example 1, except that $Mn(NO_3)_2 \cdot 6H_2O$ (1.21 g, 4.22 mmol) was used in place of $Zn(NO_3)_2 \cdot 6H_2O$. The obtained colloidal solution had a pH of 2.4.

Example 5

A colloidal solution of an iron compound was prepared in the same manner as in Example 1, except that $CrCl_3 \cdot 6H_2O$ (1.21 g, 4.54 mmol) was used in place of $Zn(NO_3)_2 \cdot 6H_2O$. The obtained colloidal solution had a pH of 2.5.

Example 6

A colloidal solution of an iron compound was prepared in the same manner as in Example 1, except that $Al(NO_3)_3 \cdot 9H_2O$ (1.56 g, 4.16 mmol) was used in place of $Zn(NO_3)_2 \cdot 6H_2O$. The obtained colloidal solution had a pH of 2.4.

Comparative Example 1

A colloidal solution of an iron compound was prepared in the same manner as in Example 1, except that $Zn(NO_3)_2 \cdot 6H_2O$ was not used. The obtained colloidal solution had a pH of 2.4.

Comparative Example 2

According to the method described in Hyperfine Interact, 2014, Vol. 224, pp. 239 to 250, a Co-doped β-FeOOH powder was prepared. Specifically, $FeCl_3 \cdot 6H_2O$ (2.69 g, 9.95 mmol), $CoCl_2 \cdot 6H_2O$ (0.298 g, 1.25 mmol), and urea (2.40 g, 40.0 mmol) were added into purified water (100 ml), and dissolved therein by stirring at room temperature (25° C.) with a magnetic stirrer using a stir bar (rotation speed: 400 rpm) for 10 minutes. By using pH test paper, the pH of the obtained solution was measured and found to be approximately 1. This solution was transferred to a container made of TEFLON(registered trademark). After the container was hermetically sealed, the resultant was left standing at a temperature of 70° C. for 48 hours. The precipitate thus formed was collected by filtration, and filtration and washing using purified water were repeated again and again. The obtained solid component was dried at 40° C. for 48 hours and then ground using a mortar. Thus, an iron compound powder was obtained.

Comparative Example 3

In a beaker, $Ni(NO_3)_2 \cdot 6H_2O$ (1.25 g, 4.20 mmol) was dissolved in ion-exchanged water (500 ml). Thereby, a raw-material aqueous solution containing a Ni ion was prepared (raw-material solution A, Fe-ion concentration: 0 mol/L). Moreover, as a raw-material solution B, 0.01 mol/L of hydrochloric acid (500 ml) was prepared. The raw-material solutions A and B were mixed and stirred together in a beaker at room temperature (25° C.) with a magnetic stirrer using a stir bar (rotation speed: 400 rpm) for 30 minutes. By using a pH meter, the pH of the obtained solution was measured and found to be 2.3.

Comparative Example 4

In a beaker, $FeCl_3 \cdot 6H_2O$ (27.30 g, 101 mmol) and $Ni(NO_3)_2 \cdot 6H_2O$ (1.25 g, 4.20 mmol) were dissolved in ion-exchanged water (500 ml). Thereby, a raw-material aqueous solution containing a metal ion was prepared which had a Fe-ion concentration of 0.2 mol/L. This raw-material aqueous solution containing a metal ion was stirred at room temperature (25° C.) with a magnetic stirrer using a stir bar (rotation speed: 400 rpm) for 30 minutes. Thus, a colloidal solution of an iron compound was prepared. The obtained colloidal solution had a pH of 1.7.

Comparative Example 5

In a beaker, an ethylenediamine solution (11 ml) having been diluted to ½ with ion-exchanged water was dissolved in ion-exchanged water (500 ml). Thereby, an aqueous solution of ethylenediamine was prepared. This aqueous solution of ethylenediamine was stirred at room temperature (25° C.) with a magnetic stirrer using a stir bar (rotation speed: 400 rpm) for 30 minutes.

<Evaluation of Properties of Iron Compound Particles>

(i) Average Particle Diameter Measurement

The solutions obtained in Examples and Comparative Examples were measured for the particle diameter distributions by dynamic light scattering using a particle diameter distribution analyzer ("Nanotrac UPA250EX" manufactured by Nikkiso Co., Ltd., laser wavelength: 780 nm, measurement range: 0.8 to 6000 nm), and a calculated volume mean diameter (MV) was taken as an average particle diameter of the corresponding iron compound particles. Table 1 shows the result. Incidentally, the iron compound powder obtained in Comparative Example 2 precipitated in the solution, so that it was difficult to measure the particle diameter distribution. In addition, the particle diameter distribution of the solution obtained in Comparative Example 3 was not obtained in the above-described measurement range.

(ii) X-Ray Diffraction Measurement

The solutions obtained in Examples and Comparative Examples were each added dropwise onto carbon paper, naturally dried, and then washed using water and an aqueous solution of 0.1 M KOH. Thus, measurement samples were prepared. Note that the iron compound powder obtained in Comparative Example 2 was directly used as a measurement sample. These measurement samples were subjected to X-ray diffraction (XRD) measurement using a powder X-ray diffraction apparatus ("Ultima IV" manufactured by Rigaku Corporation) under conditions of a tube voltage: 40 kV, a tube current: 40 mA, X-ray: $CuK\alpha$ radiation (wavelength $\lambda$=1.5418 Å). FIG. 1 shows X-ray diffraction patterns of the measurement samples prepared by using the solutions obtained in Example 3, Comparative Example 1, and Comparative Example 3. Further, in each of the obtained X-ray diffraction patterns, the presence or absence of a peak derived from the β-FeOOH crystal phase was checked, and a proportion of the β-FeOOH crystal phase in the crystalline iron compound was calculated from a peak ratio derived from crystal phases. Further, the crystallite diameter was determined from the half width of a peak derived from the crystal phase using the Scherrer equation. Table 1 shows these results.

TABLE 1

| | Dopant | | | Properties of iron compound particles | | |
| --- | --- | --- | --- | --- | --- | --- |
| | Type | Added amount [mol %] | pH of solution | Average particle diameter [nm] | Crystal phase (mol %) | Crystallite diameter [nm] |
| Ex. 1 | $Zn^{2+}$ | 4.16 | 2.2 | 13 | β-FeOOH (100) | 6 |
| Ex. 2 | $Co^{2+}$ | 4.15 | 2.2 | 11 | β-FeOOH (100) | 7 |
| Ex. 3 | $Ni^{2+}$ | 4.12 | 2.2 | 13 | β-FeOOH (100) | 5 |
| Ex. 4 | $Mn^{2+}$ | 4.18 | 2.4 | 14 | β-FeOOH (100) | 6 |
| Ex. 5 | $Cr^{2+}$ | 4.50 | 2.5 | 19 | β-FeOOH (100) | 10 |
| Ex. 6 | $Al^{3+}$ | 4.12 | 2.4 | 17 | β-FeOOH (100) | 9 |
| Comp. Ex. 1 | none | 0 | 2.4 | 11 | β-FeOOH (100) | 5 |
| Comp. Ex. 2 | $Co^{2+}$ | 12.6 | — | immeasurable | β-FeOOH (100) | 64 |
| Comp. Ex. 3 | $Ni^{2+}$ | — | 2.3 | less than detection limit | none | — |
| Comp. Ex. 4 | $Ni^{2+}$ | 4.16 | 1.7 | 11 | none | — |
| Comp. Ex. 5 | none | — | — | — | none | — |

The result shown in FIG. 1 revealed that the colloidal solutions prepared by using the Fe ion (Example 3 and Comparative Example 1) contained iron compound particles having a β-FeOOH crystal phase, regardless of Ni doping. Moreover, any peaks derived from crystal phases of other iron compounds (such as α-FeOOH, γ-FeOOH, and $Fe_2O_3$) were not observed in these iron compound particles. On the other hand, a peak indicating the presence of a crystal phase was not observed in the solution prepared by using the Ni ion solely (Comparative Example 3).

The results shown in Table 1 revealed that the colloidal solutions prepared by using the Fe ion and having a pH range of 2.2 to 2.5 (Examples 1 to 6 and Comparative Example 1) contained iron compound particles having an average particle diameter of 11 to 19 nm, regardless of the presence or absence of the dopant. Moreover, it was found out that, in these iron compound particles, all the crystal phases were constituted of a β-FeOOH crystal phase, and the crystallite diameters were 6 to 10 nm.

On the other hand, the iron compound powder obtained in Comparative Example 2 had such a large particle diameter that the particles completely precipitated in the solution. Moreover, all the crystal phases of this iron compound powder were constituted of a β-FeOOH crystal phase, but had a crystallite diameter (64 nm) six or more times as large as those of the iron compound particles obtained in Examples 1 to 6. Meanwhile, no particle diameter distribution was obtained from the solution prepared by using the Ni ion solely (Comparative Example 3); further, since the peak indicating the presence of the crystal phase was not observed in the X-ray diffraction pattern, it was speculated that no nickel compound particles were formed, and that the Ni ion was present as it was. In addition, the colloidal solution prepared without a neutralizer and having a pH of 1.7 (Comparative Example 4) contained iron compound particles having an average particle diameter (11 nm) almost equivalent to those of the iron compound particles obtained in Examples 1 to 6; furthermore, a peak indicating the presence of a crystalline iron compound was not observed in the X-ray diffraction pattern of the iron compound particles. Note that it was also verified that colloidal particles and a crystalline compound were not present in the aqueous solution of ethylenediamine (Comparative Example 5).

(iii) Electron Microscope Observation

Figure 2:
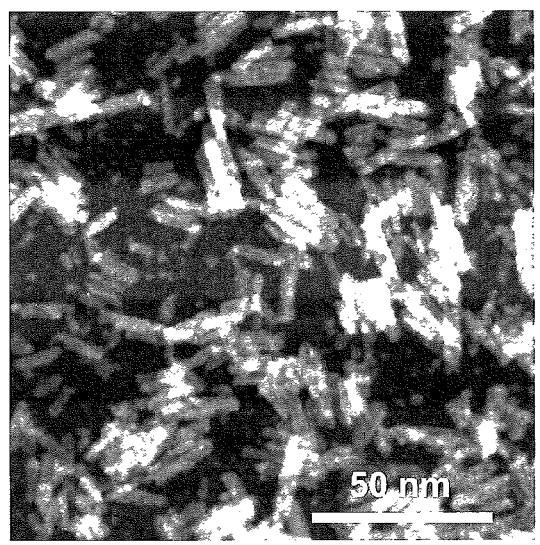
FIG. 2 is a scanning transmission electron micrograph of iron compound particles obtained in Example 1.
Figure 3:
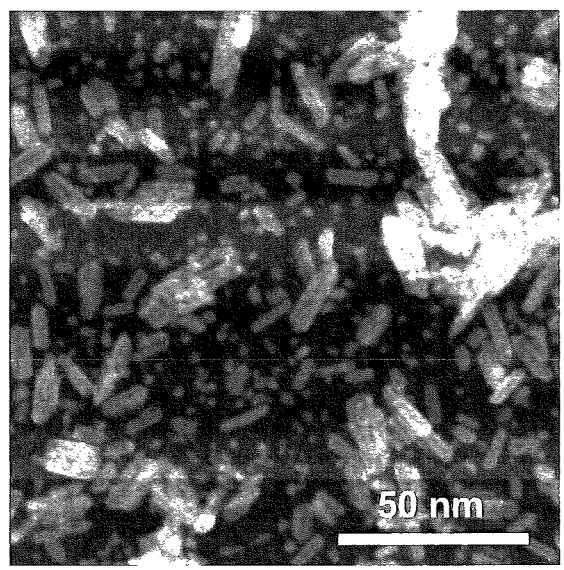
FIG. 3 is a scanning transmission electron micrograph of iron compound particles obtained in Comparative Example 1.

The iron compound particles in the colloidal solutions obtained in Examples and Comparative Examples were subjected to STEM observation using a transmission electron microscope ("JEM-2100F" manufactured by JEOL Ltd.). FIGS. 2 and 3 show STEM images of the iron compound particles obtained in Example 1 and Comparative Example 1, respectively. The results shown in FIGS. 2 and 3 revealed that the iron compound particles obtained from the colloidal solution prepared by using the Fe ion and having a pH range of 2.2 to 2.5 (Example 1 and Comparative Example 1) had thin and long shapes, regardless of the presence or absence of the dopant.

(iv) Energy-Dispersive X-Ray Spectrometry

Figure 4:
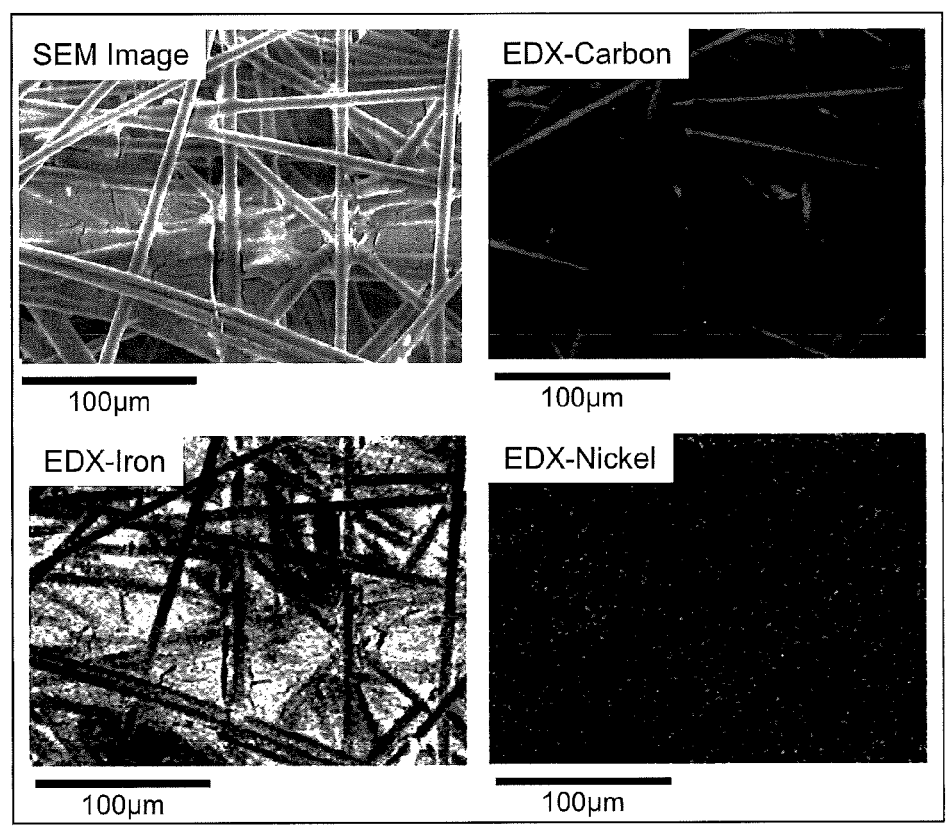
FIG. 4 shows electron micrographs showing the result of energy-dispersive X-ray spectrometry performed on iron compound particles obtained in Example 3.

The colloidal solutions obtained in Examples were each added dropwise onto carbon paper, naturally dried, and then washed using water and an aqueous solution of 0.1 M KOH. Thus, measurement samples were prepared. The measurement samples were subjected to SEM observation and EDX mapping using a scanning electron microscope ("SU3500 model" manufactured by Hitachi High-Technologies Corporation). FIG. 4 shows the SEM image and the EDX mapping results of the measurement sample prepared by using the colloidal solution obtained in Example 3. The EDX mapping result on nickel revealed that Ni was not localized but was uniformly distributed in the iron compound. Note that the EDX mapping result on carbon verified that a fibrous matter in the SEM image was a carbon fiber of the carbon paper.

(v) Oxidative Catalytic Activity Evaluation

Figure 5:
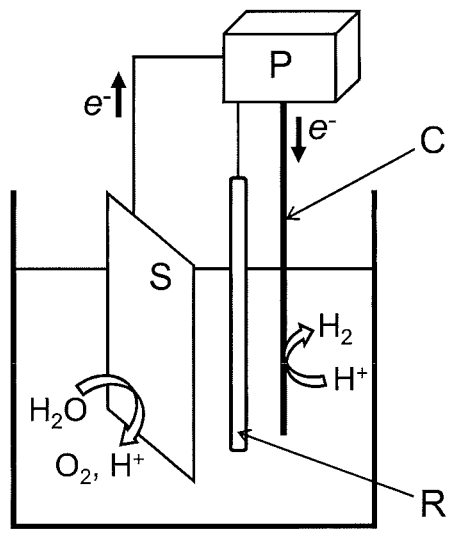
FIG. 5 is a schematic drawing showing an oxidative catalytic activity evaluation device used in Examples.

The colloidal solutions obtained in Examples and Comparative Examples were each added dropwise onto carbon paper, naturally dried, and then washed using water and an aqueous solution of 0.1 M KOH. Thus, measurement samples were prepared. The measurement sample was placed as a working electrode in an oxidative catalytic activity evaluation device shown in FIG. 5 (S in FIG. 5). Current-potential curves were obtained using a platinum wire as a counter electrode C, Ag/AgCl as a reference electrode R, and an aqueous solution of 0.1 M KOH (pH: 12.8) as a solution. In this event, the sweeping was repeated several times until the current value was stabilized.

Figure 6:
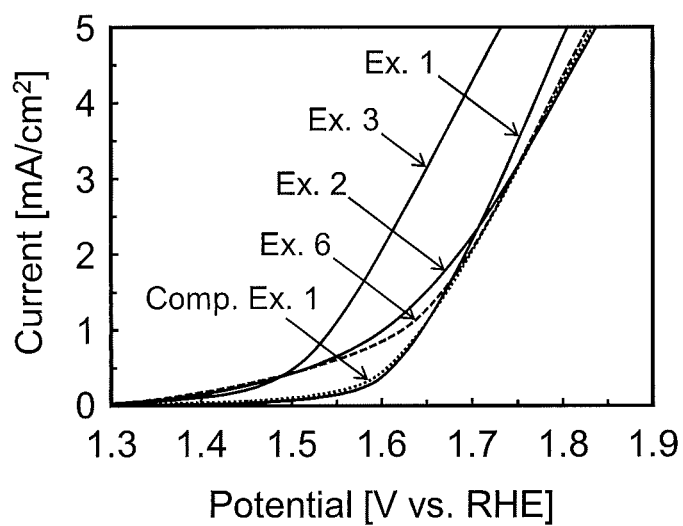
FIG. 6 is a graph showing current-potential curves of the iron compound particles obtained in Examples 1 to 3, 6 and Comparative Example 1.

FIG. 6 shows the current-potential curves of the measurement samples prepared by using the colloidal solutions obtained in Examples 1 to 3, 6 and Comparative Example 1. The result shown in FIG. 6 revealed that the onset potential of an anode current attributable to the water oxidation reaction varied depending on the type of the metal element added. Moreover, based on the obtained current-potential curves, potentials (E, unit: V vs. RHE) were determined when the current density was 0.5 mA/cm$^2$, 2 mA/cm$^2$, and 5 mA/cm$^2$, respectively. Table 2 shows the result.

TABLE 2

|  | Dopant | Potential [V vs. RHE] | | |
| --- | --- | --- | --- | --- |
|  |  | 0.5 mA/cm$^2$ | 2.0 mA/cm$^2$ | 5.0 mA/cm$^2$ |
| Ex. 1 | Zn$^{2+}$ | 1.61 | 1.67 | 1.79 |
| Ex. 2 | Co$^{2+}$ | 1.52 | 1.67 | 1.83 |
| Ex. 3 | Ni$^{2+}$ | 1.50 | 1.59 | 1.73 |
| Ex. 4 | Mn$^{2+}$ | 1.57 | 1.67 | 1.82 |
| Ex. 5 | Cr$^{2+}$ | 1.58 | 1.68 | 1.82 |
| Ex. 6 | Al$^{3+}$ | 1.52 | 1.70 | 1.83 |
| Comp. Ex. 1 | none | 1.61 | 1.70 | 1.83 |
| Comp. Ex. 2 | Co$^{2+}$ | 1.60 | 1.71 | 1.85 |

The result shown in Table 2 revealed that the iron compound particles doped with the metal element other than Fe and having a small average particle diameter and a small crystallite diameter (Examples 1 to 6) allowed a current to flow at a low voltage in comparison with the iron compound particles not doped with any metal element (Comparative Example 1) and the iron compound powder doped with the Co element and having a large average particle diameter and a large crystallite diameter (Comparative Example 2). Particularly, it was found out that the iron compound particles doped with the Co element (Example 2), the Ni element (Example 3), or the Al element (Example 6) allowed a current to flow at a lower voltage. Moreover, it was found out that the iron compound particles doped with the Ni element (Example 3) had an overpotential lower than that of the iron compound particles not doped with any metal element (Comparative Example 1) by 100 to 110 mV in a wide range of from 0.5 to 5.0 mA/cm$^2$, and were an excellent electrochemical catalyst. Further, it was found out that the iron compound particles doped with the Al element (Example 6) had a steep slope of the current onset and was excellent as an oxidation catalyst.

Example 7

A colloidal solution of an iron compound was prepared in the same manner as in Example 3, except that the amount of Ni(NO$_3$)$_2$.6H$_2$O was changed to 0.59 g (2.03 mmol). The obtained colloidal solution had a pH of 2.2.

Example 8

A colloidal solution of an iron compound was prepared in the same manner as in Example 3, except that NiCl$_2$.8H$_2$O (0.99 g, 4.20 mmol) was used in place of Ni(NO$_3$)$_2$.6H$_2$O. The obtained colloidal solution had a pH of 2.2.

Example 9

A colloidal solution of an iron compound was prepared in the same manner as in Example 3, except that the amount of Ni(NO$_3$)$_2$.6H$_2$O was changed to 2.53 g (8.70 mmol). The obtained colloidal solution had a pH of 2.3.

Example 10

A colloidal solution of an iron compound was prepared in the same manner as in Example 3, except that the amount of Ni (NO$_3$)$_2$.6H$_2$O was changed to 5.54 g (19.1 mmol). The obtained colloidal solution had a pH of 2.4.

<Evaluation of Properties of Iron Compound Particles>

Using the obtained colloidal solutions, the iron compound particles were subjected to average particle diameter measurement, X-ray diffraction measurement, and oxidative catalytic activity evaluation according to the methods described above. Moreover, according to the following method, ICP emission spectrometry was performed. Table 3 shows these results.

(vi) ICP Emission Spectrometry

The colloidal solutions obtained in Examples and Comparative Example were each added dropwise onto carbon paper to prepare measurement samples having the colloidal particles supported thereon. The measurement samples were subjected to ICP emission spectrometry using an ICP emission spectrometer ("CIROS-120 EOP" manufactured by Rigaku Corporation) to determine an atomic ratio of the metal element other than Fe to the Fe element (metal element other than Fe/Fe element).

Example 11

A colloidal solution of an iron compound was prepared in the same manner as in Example 3, except that the amount of ethylenediamine was changed such that the colloidal solution had a pH of 2.6.

Example 12

A colloidal solution of an iron compound was prepared in the same manner as in Example 3, except that the amount of ethylenediamine was changed such that the colloidal solution had a pH of 2.8.

TABLE 3

| | Amount of Ni added [mol %] | pH of solution | Properties of iron compound particles | | | | |
|---|---|---|---|---|---|---|---|
| | | | Average particle diameter [nm] | Crystal phase (mol %) | Crystallite diameter [nm] | Ni/Fe | Potential [V vs. RHE] 2.0 mA/cm$^2$ |
| Ex. 7 | 2.01 | 2.2 | 12 | β-FeOOH (100) | 5 | 0.003 | 1.65 |
| Ex. 3 | 4.12 | 2.2 | 13 | β-FeOOH (100) | 5 | 0.012 | 1.59 |
| Ex. 8 | 4.16 | 2.2 | 18 | β-FeOOH (100) | 5 | 0.016 | 1.60 |
| Ex. 9 | 8.61 | 2.3 | 14 | β-FeOOH (100) | 5 | 0.020 | 1.59 |
| Ex. 10 | 18.9 | 2.4 | 37 | β-FeOOH (100) | 5 | 0.029 | 1.59 |
| Comp. Ex. 1 | 0 | 2.4 | 11 | β-FeOOH (100) | 5 | 0 | 1.70 |

The results shown in Table 3 revealed that even when the amount of Ni added was changed, the iron compound particles having an average particle diameter of 12 to 37 nm were obtained. Moreover, it was found out that when the amount of Ni added was 4 mol % or less, the larger the amount of Ni added, the lower the voltage at which a current flowed, hence improving the oxidative catalytic activity. However, when the amount of Ni added exceeded approximately 4 mol % and was approximately 19 mol % or less, a further decrease in the overpotential was hardly observed.

Further, the Ni/Fe atomic ratios in the obtained iron compound particles were 0.012 (Example 3), 0.003 (Example 7), 0.016 (Example 8), 0.020 (Example 9), and 0.029 (Example 10). In consideration that $Ni^{2+}$ hydroxide deposits at a pH of 6.2 or more and $Fe^{3+}$ hydroxide deposits at a pH of 2.5 to 2.1, it was speculated that 29 at % (Example 3), 15 at % (Example 7), 38 at % (Example 8), 23 at % (Example 9), and 15 at % (Example 10) of the added Ni ion were incorporated during the β-FeOOH crystal phase formation.

Comparative Example 6

A colloidal solution of an iron compound was prepared in the same manner as in Example 3, except that the amount of ethylenediamine was changed such that the colloidal solution had a pH of 1.6.

Comparative Example 7

A colloidal solution of an iron compound was prepared in the same manner as in Example 3, except that the amount of ethylenediamine was changed such that the colloidal solution had a pH of 6.8.

Comparative Example 8

A colloidal solution of an iron compound was prepared in the same manner as in Example 3, except that the amount of ethylenediamine was changed such that the colloidal solution had a pH of 8.1.

<Evaluation of Properties of Iron Compound Particles>

Using the obtained colloidal solutions, the iron compound particles were subjected to average particle diameter measurement, X-ray diffraction measurement, and oxidative catalytic activity evaluation according to the methods described above. Table 4 shows the results.

TABLE 4

| | Properties of iron compound particles | | | | | |
|---|---|---|---|---|---|---|
| | pH of solution | Average particle diameter [nm] | Crystal phase (mol %) | Crystallite diameter [nm] | Potential [V vs. RHE] | |
| | | | | | 2.0 mA/cm$^2$ | 5.0 mA/cm$^2$ |
| Ex. 3 | 2.2 | 13 | β-FeOOH (100) | 5 | 1.59 | 1.73 |

TABLE 4-continued

| | | Properties of iron compound particles | | | | |
|---|---|---|---|---|---|---|
| | pH of solution | Average particle diameter [nm] | Crystal phase (mol %) | Crystallite diameter [nm] | Potential [V vs. RHE] | |
| | | | | | 2.0 mA/cm² | 5.0 mA/cm² |
| Ex. 11 | 2.6 | 100 | β-FeOOH (100) | 6 | 1.62 | 1.78 |
| Ex. 12 | 2.8 | 230 | β-FeOOH (100) | 6 | 1.62 | 1.77 |
| Comp. Ex. 6 | 1.6 | 11 | none | — | 1.63 | 1.80 |
| Comp. Ex. 7 | 6.8 | 770 | α-FeOOH (100) | 26 | 1.66 | 1.81 |
| Comp. Ex. 8 | 8.1 | 1200 | α-FeOOH (56) α-Fe₂O₃ (44) | 24 | 1.63 | 1.80 |

The results shown in Table 4 revealed that the average particle diameter, the type of the crystal phase, and the crystallite diameter of the iron compound particles depended on the pH of the colloidal solution. Specifically, when the colloidal solution had a pH of 2.2 to 2.8 (Examples 3, 11, and 12), the obtained iron compound particles had an average particle diameter of 13 to 230 nm and a crystallite diameter of 5 to 6 nm, in which all the crystal phases were constituted of a β-FeOOH crystal phase. On the other hand, when the colloidal solution had a pH of 1.6 (Comparative Example 6), the obtained iron compound particles had an average particle diameter of 11 nm, but no crystal phase was present in the iron compound particles. Moreover, when the colloidal solution had a pH of 6.8 (Comparative Example 7), the obtained iron compound particles had an average particle diameter of 770 nm and a crystallite diameter of 26 nm, in which all the crystal phases were constituted of an α-FeOOH crystal phase; however, iron compound particles comprising a β-FeOOH crystal phase were not obtained. Further, when the colloidal solution had a pH of 8.1 (Comparative Example 8), the obtained iron compound particles had an average particle diameter of 1200 nm and a crystallite diameter of 24 nm, in which the crystal phases were constituted of an α-FeOOH crystal phase and α-Fe₂O₃; however, iron compound particles comprising a β-FeOOH crystal phase were not obtained.

In addition, it was found out that the iron compound particles prepared from the colloidal solutions having a pH range of 2.2 to 2.8 (Examples 3, 11, and 12) allowed a current to flow at a low voltage and had an excellent oxidative catalytic activity in comparison with the iron compound particles prepared from the colloidal solutions having a pH range of less than 1.8 or more than 5.0 (Comparative Examples 6 to 8).

Example 13

A colloidal solution of an iron compound was prepared in the same manner as in Example 3, except that ammonia was used in place of ethylenediamine. The obtained colloidal solution had a pH of 2.1.

Example 14

A colloidal solution of an iron compound was prepared in the same manner as in Example 3, except that sodium hydroxide was used in place of ethylenediamine. The obtained colloidal solution had a pH of 2.1.

Example 15

A colloidal solution of an iron compound was prepared in the same manner as in Example 3, except that monoethanolamine was used in place of ethylenediamine. The obtained colloidal solution had a pH of 2.2.

<Evaluation of Properties of Iron Compound Particles>

Using the obtained colloidal solutions, the iron compound particles were subjected to average particle diameter measurement, X-ray diffraction measurement, ICP emission spectrometry, and oxidative catalytic activity evaluation according to the methods described above. Table 5 shows the results.

TABLE 5

| | | Properties of iron compound particles | | | | | |
|---|---|---|---|---|---|---|---|
| | Neutralizer | pH of solution | Average particle diameter [nm] | Crystal phase (mol %) | Crystallite diameter [nm] | Ni/Fe | Potential [V vs. RHE] 2.0 mA/cm² |
| Ex. 3 | ethylenediamine | 2.2 | 13 | β-FeOOH (100) | 5 | 0.012 | 1.59 |
| Ex. 13 | ammonia | 2.1 | 17 | β-FeOOH (100) | 5 | 0.021 | 1.67 |
| Ex. 14 | sodium hydroxide | 2.1 | 13 | β-FeOOH (100) | 5 | 0.038 | 1.62 |
| Ex. 15 | monoethanolamine | 2.2 | 14 | β-FeOOH (100) | 5 | 0.030 | 1.65 |
| Comp. Ex. 1 | ethylenediamine | 2.4 | 11 | β-FeOOH (100) | 5 | 0 | 1.83 |
| Comp. Ex. 4 | none | 1.7 | 38 | none | — | not measured | 1.69 |

TABLE 5-continued

| | | | Properties of iron compound particles | | | | |
|---|---|---|---|---|---|---|---|
| | Neutralizer | pH of solution | Average particle diameter [nm] | Crystal phase (mol %) | Crystallite diameter [nm] | Ni/Fe | Potential [V vs. RHE] 2.0 mA/cm$^2$ |
| Comp. Ex. 5 | ethylenediamine | — | — | none | — | not measured | 1.85 |

The results shown in Table 5 revealed that even when the type of the neutralizer was changed (Examples 3, 13 to 15), the obtained iron compound particles had an average particle diameter of 13 to 17 nm. Further, the potential at 2.0 mA/cm$^2$ varied depending on the type of the neutralizer, and the oxidative catalytic activity depended on the type of the neutralizer. Nevertheless, it was found out that even when any neutralizer was used (Examples 3, 13 to 15), the Ni doping allowed a current to flow at a low voltage and improved the oxidative catalytic activity, in comparison with the iron compound particles not doped with any metal element (Comparative Example 1). Moreover, when only ethylenediamine was supported on the carbon paper (Comparative Example 5), the potential at 2.0 mA/cm$^2$ was quite high, and the oxidative catalytic activity was hardly exhibited by the neutralizer. Thus, it was speculated that, in the iron compound particles obtained in Examples, the β-FeOOH crystal phase doped with the metal element contributed to the oxidative catalytic activity.

Further, the Ni/Fe atomic ratios in the obtained iron compound particles were 0.021 (Example 13), 0.038 (Example 14), and 0.030 (Example 15). These values indicate that the β-FeOOH crystal phase was doped with 51 at % (Example 13), 92 at % (Example 14), and 73 at % (Example 15) of the added Ni$^{2+}$ ion. In consideration that Ni$^{2+}$ hydroxide deposits at a pH of 6.2 or more and that Fe$^{3+}$ hydroxide deposits at a pH of 2.5 to 2.1, it was speculated that 51 at % (Example 13), 92 at % (Example 14), and 73 at % (Example 15) of the added Ni ion were incorporated during the β-FeOOH crystal phase formation.

(vii) Water-Splitting Activity Evaluation

Figure 7:
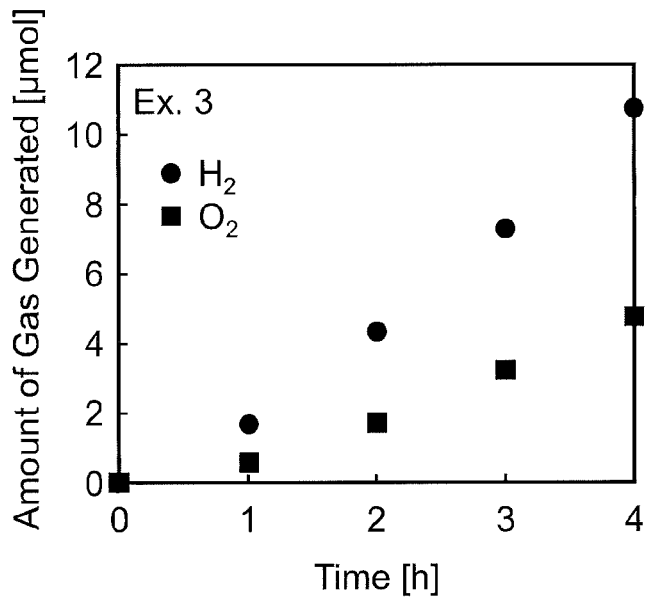
FIG. 7 is a graph showing changes over times in amounts of gases generated in a water splitting reaction using the iron compound particles obtained in Example 3.
Figure 8:
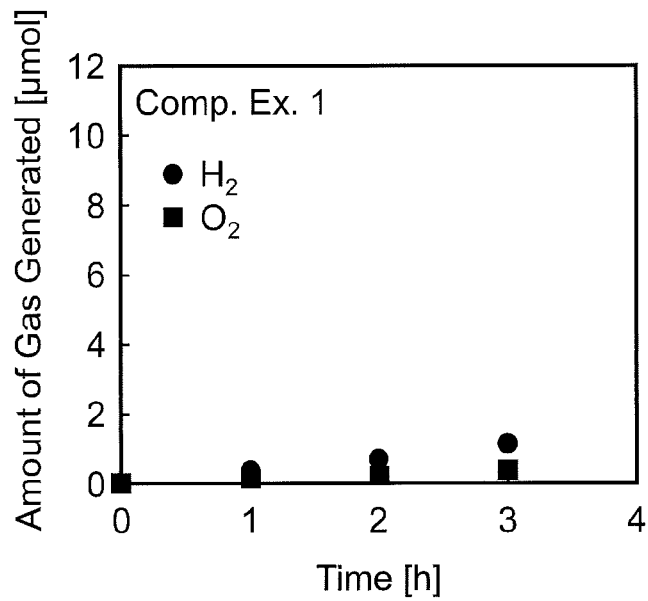
FIG. 8 is a graph showing changes over times in amounts of gases generated in a water splitting reaction using the iron compound particles obtained in Comparative Example 1.

The colloidal solutions obtained in Example and Comparative Example were each added dropwise onto carbon paper, naturally dried, and then washed using water and an aqueous solution of 0.1 M KOH. Thus, measurement samples were prepared. Using the measurement sample as a working electrode, a water splitting reaction was carried out in a hermetically sealed cell in an argon atmosphere. A platinum wire was used as the counter electrode C, Ag/AgCl was used as the reference electrode R, and an aqueous solution of 0.1 M KOH (pH: 12.8) was used as the solution. A voltage of +0.6 V (vs. Ag/AgCl, equivalent to 1.58 V in RHE) was applied, and the product was quantified with a gas chromatograph. FIGS. 7 and 8 show the results.

As shown in FIG. 7, in the iron compound particles doped with the Ni element (Example 3), hydrogen and oxygen were generated substantially at a stoichiometric ratio over time, and the current efficiency reached substantially 100%. Hence, it was found out that oxygen was generated on the iron compound particles by the water oxidation reaction with the iron compound particles, and that electrons generated at the same time reacted with protons on Pt of the counter electrode, thereby generating hydrogen, so that the water splitting reaction progressed. On the other hand, as shown in FIG. 8, in the iron compound particles not doped with any metal element (Comparative Example 1), the water splitting reaction slightly progressed, but for 3 hours after the reaction started, the amount of oxygen generated was approximately 1/15 of the iron compound particles doped with the Ni element (Example 3), revealing that the catalytic activity was quite low.

Figure 9:
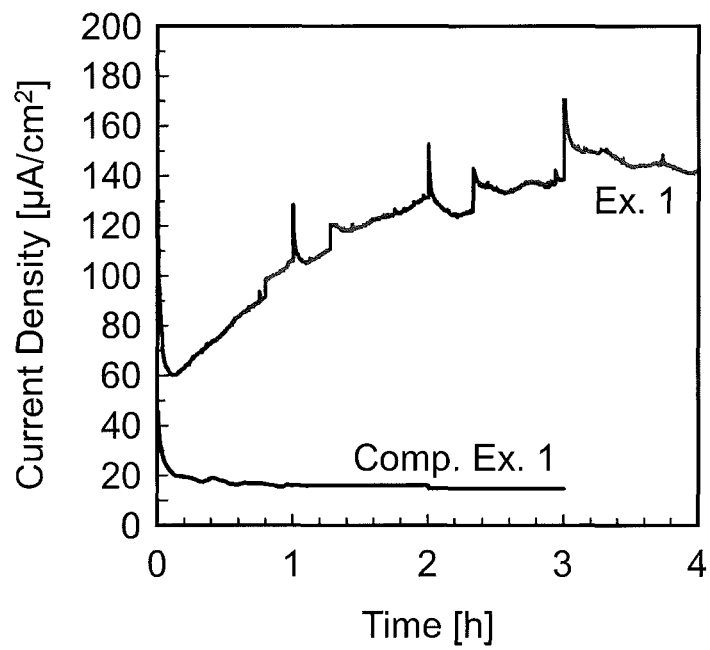
FIG. 9 is a graph showing changes over times in current densities in the water splitting reactions using the iron compound particles obtained in Example 3 and Comparative Example 1.

Moreover, FIG. 9 shows changes over times in current densities in the water splitting reactions. As shown in FIG. 9, in the iron compound particles doped with the Ni element (Example 3), the current density tended to be stable and slightly increase during the voltage application for 4 hours; meanwhile, in the iron compound particles not doped with any metal element (Comparative Example 1), the current density gradually decreased during the voltage application for 3 hours. These results revealed that the iron compound particles doped with the metal element was excellent also in the stability of the catalytic activity.

Example 16

A colloidal solution of an iron compound was prepared in the same manner as in Example 3, except that the amount of Ni(NO$_3$)$_2$.6H$_2$O was changed to 7.28 g (25.0 mmol). The obtained colloidal solution had a pH of 2.1.

Example 17

A colloidal solution of an iron compound was prepared in the same manner as in Example 3, except that the amount of Ni(NO$_3$)$_2$.6H$_2$O was changed to 14.55 g (50.0 mmol). The obtained colloidal solution had a pH of 2.1.

Example 18

A colloidal solution of an iron compound was prepared in the same manner as in Example 3, except that the amount of Ni(NO$_3$)$_2$.6H$_2$O was changed to 21.83 g (75.1 mmol). The obtained colloidal solution had a pH of 2.2.

<Evaluation of Properties of Iron Compound Particles>

Figure 10:
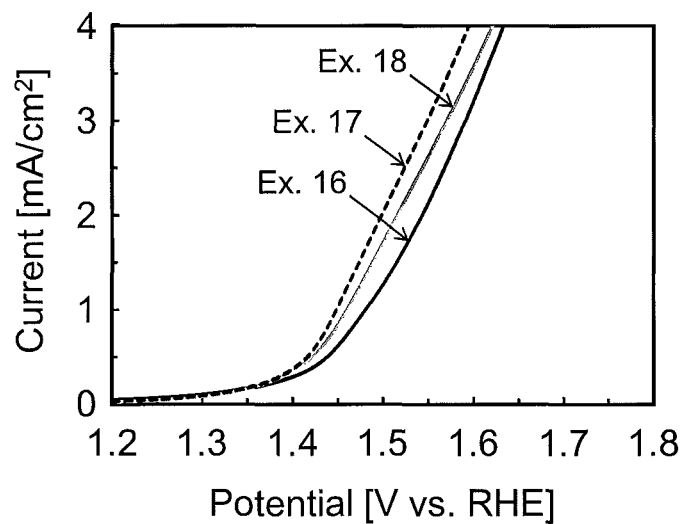
FIG. 10 is a graph showing current-potential curves of iron compound particles obtained in Examples 16 to 18.
Figure 11:
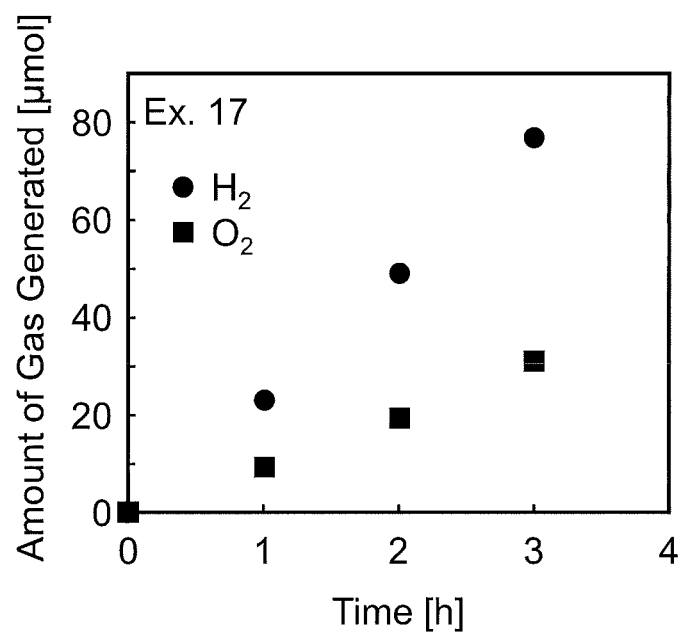
FIG. 11 is a graph showing changes over times in amounts of gases generated in a water splitting reaction using the iron compound particles obtained in Example 17.

Using the obtained colloidal solutions, the iron compound particles were subjected to average particle diameter measurement, X-ray diffraction measurement, and ICP emission spectrometry according to the methods described above. Table 6 shows the results. Moreover, using the obtained colloidal solutions, the iron compound particles were subjected to oxidative catalytic activity evaluation according to the method described above. FIG. 10 shows the current-potential curves of measurement samples prepared by using the colloidal solutions obtained in Examples 16 to 18. Based on the obtained current-potential curves, potentials (E, unit: V vs. RHE) were determined when the current density was 2 mA/cm$^2$. Table 6 shows the result. Further, using the obtained colloidal solutions, the iron compound particles were subjected to water-splitting activity evaluation according to the method described above. FIG. 11 shows the result.

TABLE 6

| | Amount of Ni added [mol %] | pH of solution | Properties of iron compound particles | | | | Potential [V vs. RHE] 2.0 mA/cm² |
| --- | --- | --- | --- | --- | --- | --- | --- |
| | | | Average particle diameter [nm] | Crystal phase (mol %) | Crystallite diameter [nm] | Ni/Fe | |
| Ex. 16 | 24.8 | 2.1 | 9 | β-FeOOH (100) | 4 | 0.11 | 1.54 |
| Ex. 17 | 49.5 | 2.1 | 11 | β-FeOOH (100) | 5 | 0.29 | 1.49 |
| Ex. 18 | 74.4 | 2.2 | 10 | β-FeOOH (100) | 5 | 0.38 | 1.52 |
| Comp. Ex. 1 | 0 | 2.4 | 11 | β-FeOOH (100) | 5 | 0 | 1.70 |

The result shown in Table 6 revealed that even when the amount of Ni added was increased to 20 mol % or more (Examples 16 to 18), the iron compound particles having an average particle diameter of 9 to 11 nm were obtained. Moreover, it was found out that, in these iron compound particles, all the crystal phases were constituted of a β-FeOOH crystal phase, the crystallite diameters were 4 to 5 nm, and the Ni/Fe atomic ratios were 0.11 to 0.38. Further, it was found out that these iron compound particles allowed a current to flow at a low voltage, had overpotentials decreased by 160 to 210 mV, and were excellent electrochemical catalysts, in comparison with the iron compound particles not doped with any metal element (Comparative Example 1).

In addition, as shown in FIG. 11, in the iron compound particles doped with the Ni element (Example 17), hydrogen and oxygen were generated substantially at a stoichiometric ratio over time. Hence, it was found out that, by the water oxidation reaction with the iron compound particles having the increased Ni/Fe atomic ratio, oxygen was generated also on the iron compound particles, and that electrons generated at the same time reacted with protons on Pt of the counter electrode, thereby generating hydrogen, so that the water splitting reaction progressed. Particularly, it was found out that the iron compound particles having a Ni/Fe atomic ratio of 0.29 (Example 17) generated oxygen in an amount approximately 10 times as large as that of the iron compound particles having a Ni/Fe atomic ratio of 0.012 (Example 3), and had a quite high water-splitting activity.

(viii) Shape Observation and Size Measurement

The iron compound particles in the colloidal solutions obtained in Examples were observed using a transmission electron microscope ("JEM-2100F" manufactured by JEOL Ltd.). In each of the obtained DF-STEM images, the shapes of 50 or more iron compound primary particles randomly sampled were observed. Moreover, these 50 or more iron compound primary particles were measured for the lengths of major axes and minor axes. Thereby, an average length of the major axes was determined. Further, ratios of the major axes to the minor axes in terms of length (major axes/minor axes) were calculated to determine an average value thereof (average axis ratio). Table 7 shows these results.

TABLE 7

| | Dopant | | | Properties of iron compound particles | | |
| --- | --- | --- | --- | --- | --- | --- |
| | Type | Added amount [mol %] | pH of solution | Shape | Average length of major axes [nm] | Average axis ratio (major axes/ minor axes) |
| Ex. 1 | $Zn^{2+}$ | 4.16 | 2.2 | nanorod | 16 | 4.8 |
| Ex. 2 | $Co^{2+}$ | 4.15 | 2.2 | nanorod | 17 | 5.0 |
| Ex. 16 | $Ni^{2+}$ | 24.8 | 2.1 | nanorod | 16 | 4.8 |
| Ex. 17 | $Ni^{2+}$ | 49.5 | 2.1 | nanorod | 14 | 4.5 |

As shown in Table 7, it was verified that: in the iron compound particles of the present invention prepared by using $Fe^{3+}$ (Examples 1, 2, 16, 17), the primary particles were in the shape of nanorod, the major axes had an average length of 14 to 17 nm, and the average axis ratio (major axes/minor axes) was 4.5 to 5.0.

As has been described above, the present invention makes it possible to easily obtain iron compound particles having an excellent oxidative catalytic activity. Moreover, it is possible to obtain the iron compound particles of the present invention in the form of colloidal solution. Thus, the iron compound particles of the present invention is easily fixed to a support when the support (for example, electro-conductive material, semiconductor material, insulating material) or the like is coated with a colloidal solution thereof, making it possible to impart the oxidation catalyst function to the support.

Further, the iron compound particles of the present invention can be produced using inexpensive materials at normal temperature without using specialized production apparatus. Accordingly, the development of the usage in a wide range can be expected. Furthermore, in addition to the utilization as an electrochemical water oxidation catalyst, the application of the iron compound particles of the present invention to artificial photosynthesis systems can also be expected in combination with, for example, photocatalysts.

REFERENCE SIGNS LIST

C: counter electrode
P: power supply
R: reference electrode
S: measurement sample

What is claimed is:

1. Iron compound particles comprising a β-FeOOH crystal phase and a metal element other than Fe with which the β-FeOOH crystal phase is doped, wherein the metal element other than Fe is at least one metal element selected from the group consisting of elements of Al as well as 3d and 4d transition metals belonging to periodic table Groups 4 to 12 other than Fe, an atomic ratio of the metal element other than Fe to the Fe element (metal element other than Fe/Fe element) is 0.001 to 0.5, and the iron compound particles satisfy at least one of the following requirements (A) and (B):
  (A) having a crystallite diameter of 1 to 60 nm when measured by X-ray diffraction; and
  (B) having an average particle diameter of 1 to 600 nm when measured by dynamic light scattering in a solvent.

2. The iron compound particles according to claim 1, wherein a content of the β-FeOOH crystal phase is 50 to 100 mol % relative to that of all iron compound crystal phases.

3. The iron compound particles according to claim 1, wherein both of the requirements (A) and (B) are satisfied.

4. The iron compound particles according to claim 1, wherein
  primary particles thereof are rod shaped,
  major axes of the primary particles have an average length of 1 to 50 nm, and
  an average ratio of the major axes to minor axes in terms of length (major axes/minor axes) is 3 to 10.

5. The iron compound particles according to claim 1, wherein
the metal element other than Fe is at least one metal element selected from the group consisting of a Ni element, a Co element, a Mn element, a Cr element, a Zn element and an Al element.

6. An oxidation catalyst comprising the iron compound particles according to claim 1.

7. A method for producing the iron compound particles according to claim 1, comprising preparing a colloidal solution having a pH of 1.8 to 5.0 by mixing a raw-material solution A containing a Fe ion and at least one metal ion other than the Fe ion selected from the group consisting of an Al ion as well as 3d and 4d transition metal ions belonging to periodic table Groups 4 to 12 other than the Fe ion with a raw-material solution B containing a neutralizer, so that iron compound particles having the β-FeOOH crystal phase doped with the metal element other than Fe are obtained.

8. The method for producing iron compound particles according to claim 7, wherein
  the metal ion other than the Fe ion is at least one metal ion selected from the group consisting of a Ni ion, a Co ion, a Mn ion, a Cr ion, a Zn ion and an Al ion.

9. The method for producing iron compound particles according to claim 7, wherein
  the neutralizer is a basic compound.

* * * * *